Dec. 2, 1924.

J. W. PIGOTT 1,517,749

ANTISKID CHAIN

Filed Nov. 21, 1923

J. W. Pigott
Inventor

By Clarence A. O'Brien
Attorney

Patented Dec. 2, 1924.

1,517,749

UNITED STATES PATENT OFFICE.

JEWELL W. PIGOTT, OF TYLERTOWN, MISSISSIPPI.

ANTISKID CHAIN.

Application filed November 21, 1923. Serial No. 676,101.

*To all whom it may concern:*

Be it known that I, JEWELL W. PIGOTT, citizen of the United States, residing at Tylertown, in the county of Walthall and State of Mississippi, have invented certain new and useful Improvements in Antiskid Chains, of which the following is a specification.

This invention relates to anti-skid chains for vehicle wheels particularly adapted for use upon broad tread truck wheels although capable of general application.

The primary object of the invention is to provide an anti-skid chain which is of simple and durable construction, and efficient in operation.

Another object of the invention is to provide an anti-skid chain which may be easily and expeditiously applied to or removed from a vehicle wheel.

A further object of the invention is to provide an anti-skid chain which will effectively prevent longitudinal and lateral skidding of a vehicle whose wheels are equipped with the same.

Still another object of the invention is to provide an anti-skid chain which will not creep materially circumferentially of the wheels and wherein the said chain of which will be caused to snugly engage the tire tread upon the occurrence of such slight circumferential creeping that is allowed.

Other objects will appear as the nature of the invention is better understood, and the same consists in the novel form, combination, and arrangement of parts hereinafter more fully described, shown in the accompanying drawings and claimed.

In the drawing, wherein like reference characters designate corresponding parts throughout the several views.

Referring more in detail to the drawings, the present device embodies a tread chain consisting of a plurality of chain loops 5 serially connected at diametrically opposite points centrally of the tire tread as indicated at 6 and having radial side chains 7 attached to the opposite sides thereof intermediate the points of connection of the loop elements 5 indicated at 6. In other words, as viewed when in use upon the wheel, the chain loops 5 are diamond shape in plane with the central circumferentially aligned points thereof connected as mentioned above at 6 and with the side transversely aligned corners thereof connected to the outer ends of the radial side chains 7 as indicated at 8. Each chain loop 5 thus presents a V-shaped portion at the tread of the tire for resisting skidding longitudinally in either direction irrespective of whether the vehicle is travelling forwardly or backwardly, while at the same time similar V-shaped portions are presented at opposite sides of each chain loop 5 for effectively preventing lateral or sidewise skidding in either direction. The tread chain thus constructed is of endless form and in order to facilitate its application to or removal from the tire, one of the loops 5 is composed of sections detachably connected at opposite sides as generally indicated at 9.

Figure 1:
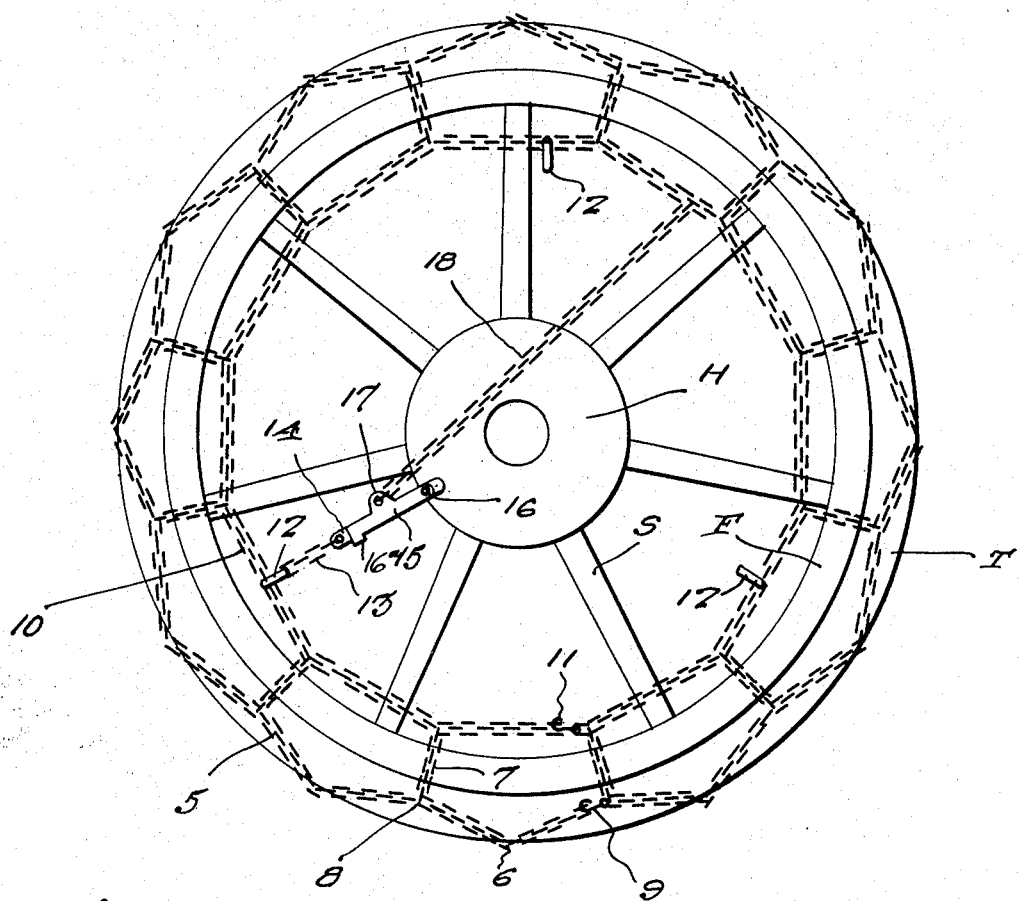
Figure 1 is a side elevational view of a vehicle wheel equipped with an anti-skid chain constructed in accordance with the present invention.
Figure 2:
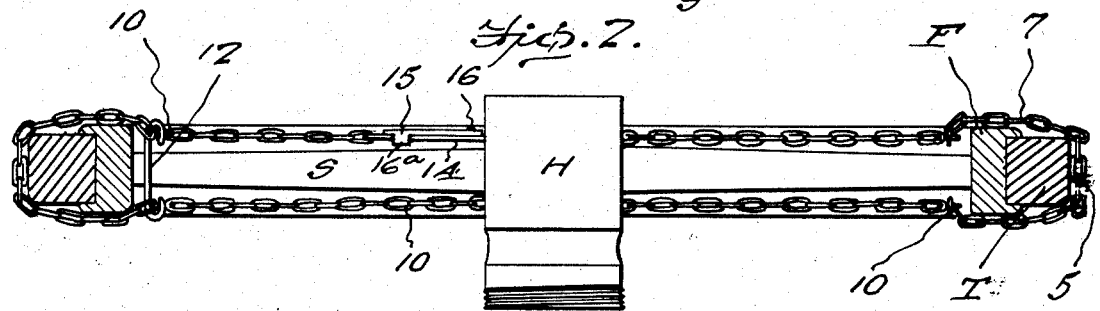
Figure 2 is an enlarged substantially central radial sectional view of the device shown in Figure 1.
Figure 3:
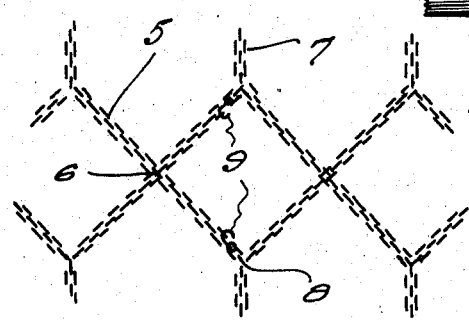
Figure 3 is a fragmentary plan view showing a portion of the said chain of the device with portions of the attached radial chain.

Disposed at each side of the wheel inwardly of the felly thereof is an endless chain 10 that is formed of a length of chain having the ends thereof detachably jointed as indicated at 11 in Figure 1, and the chain 10 at one side of the wheel is connected with the radial chains 7 at the same sides thereof, while the chain 10 at the other side of the wheel is similarly attached to the radial chains 7 at said other side. Thus, the chains 7 will be drawn radially inwardly upon tightening of the chain 10, at one side of the wheel so as to place the chain loops 5 of the tread chain under tension for drawing the latter into snug engagement with the tread of the tire and causing the same to assume a pronounced triangular form as shown in Figure 3, and as described above. When the chains 10 are disposed thru the inner end links of the chain 7, said chains 10 will assume the angular form as shown in side elevation, in Figure 1. In order to further aid in holding the side chains into engagement with the tread of the tire, and to prevent outward movement or separation of the side chains 10, the latter are connected at intervals by means of a plurality of transverse double ended hooks 12 extending transversely of the wheel between certain of the spokes and inwardly of the wheel felly as shown in Figures 1 and 2.

To aid further in maintaining the anti-skid chain in position on the tire, I provide what may be conveniently referred to as a chain tightening device. This device comprises two separate lengths of chain, the short length of which is represented by the reference character 13, the same being connected at its inner end to one end of a link 14, which in turn has pivotal connection with a lever 15, as at 16. The lever is adapted to be swung into overlapping relation with the link, and to limit the swinging movement it is provided at its free end with the laterally directed lug 16ᵃ, constituting a stop, the same being intended to engage the adjacent edge of the link. The longer length of chain which is designated by the reference character 18 is connected at its inner end to an ear 17 on the intermediate portion of the lever 15. In practice, the outer end of the chains 13 and 18 may be connected in any appropriate manner to the aforesaid side chain 10.

It will thus be seen that when the lever 15 is swung inwardly about the pivot 16, the adjacent end of the chain section 18 will be moved inwardly apast the pivot 16 for loosening the device. On the other hand, when said lever 15 is swung outwardly to the position shown in Figure 1, the adjacent end of the chain section 18 is positioned outwardly of the pivot 16 and the chain 10 to which this device is adapted to be connected is effectively tightened for drawing the said chain into snug engagement with the tread of the tire. The wheel shown consists of a hub H rigidly connected with the wheel felly F by means of radial rigid spokes S, which felly carries a suitable tire T.

When it is desired to remove the anti-skid chain, the chain tightening device is loosened in the manner described, the double ended hooks 12 are removed, and the hooks 9 and 11 carried by the anti-skid chains are detached.

From the above description, it is believed that the construction and operation as well as the advantages of the present invention will be readily understood and appreciated by those skilled in the art.

What I claim as new is:

A chain tightening device comprising a link, a short length of chain connected to one end of said link, a lever pivotally connected to the opposite end of the link, said lever being adapted to swing into overlapping relation with said link and being provided at its free end with a stop to engage the link, the lever being also provided intermediate its ends with an attaching ear, and another length of chain connected at its inner end to said attaching ear.

In testimony whereof I affix my signature.

JEWELL W. PIGOTT.